(12) United States Patent
Hanratty

(10) Patent No.: US 8,479,368 B2
(45) Date of Patent: Jul. 9, 2013

(54) METHOD OF SECURING A WALL ANCHOR TO A WALL

(76) Inventor: Brent Hanratty, Westlake Village, CA (US)

(*) Notice: Subject to any disclaimer, the term of this patent is extended or adjusted under 35 U.S.C. 154(b) by 345 days.

(21) Appl. No.: 12/913,264

(22) Filed: Oct. 27, 2010

(65) Prior Publication Data

US 2011/0094181 A1 Apr. 28, 2011

Related U.S. Application Data

(60) Provisional application No. 61/255,787, filed on Oct. 28, 2009.

(51) Int. Cl.
*B21D 39/00* (2006.01)
*F16B 13/04* (2006.01)

(52) U.S. Cl.
USPC ............. 29/522.1; 29/525.01; 29/525.13; 52/704; 411/82.1

(58) Field of Classification Search
USPC .... 29/522.1, 525.01, 525.13; 52/704; 411/29, 411/30, 31, 32, 33, 44, 80.1, 80.2, 82, 82.1, 411/82.2, 82.3, 19
See application file for complete search history.

(56) References Cited

U.S. PATENT DOCUMENTS

| | | | |
|---|---|---|---|
| 3,108,404 A | 10/1963 | Lamb | |
| 4,001,989 A | 1/1977 | Fischer | |
| 4,044,512 A | 8/1977 | Fischer et al. | |
| 4,083,162 A * | 4/1978 | Regan et al. | 52/699 |
| 4,096,672 A | 6/1978 | Fischer et al. | |
| 4,120,128 A | 10/1978 | Pauls | |
| 4,214,416 A | 7/1980 | Fischer | |
| 4,355,933 A | 10/1982 | Fischer | |
| 4,790,114 A | 12/1988 | Falco | |
| 4,826,373 A | 5/1989 | Nakano | |
| 4,836,729 A | 6/1989 | Bisping et al. | |
| 4,893,974 A | 1/1990 | Fischer et al. | |
| 5,007,780 A | 4/1991 | Hoffmann et al. | |
| 5,339,593 A | 8/1994 | Ludwig et al. | |
| 5,761,870 A | 6/1998 | Goto | |
| 5,819,497 A | 10/1998 | Knepper | |
| 6,588,999 B2 | 7/2003 | Kubler | |
| 6,837,659 B2 | 1/2005 | Oberkofler | |
| 6,902,366 B2 | 6/2005 | Ducker, III et al. | |
| 7,404,274 B2 | 7/2008 | Hayes | |

* cited by examiner

*Primary Examiner* — Jermie Cozart
(74) *Attorney, Agent, or Firm* — Cislo & Thomas, LLP

(57) ABSTRACT

An anchoring device comprising a hollow shaft having a first end and a second end, and an anchor attached to the second end, wherein the anchor comprises a plurality of flukes to secure the anchoring device to a wall and at least one hole in fluid communication with the shaft to deliver a securing compound injected into the first end of the shaft to the flukes to facilitating securing the anchoring device to the wall. The flukes may be bendable or hingedly attached to the base of the anchor so as to accommodate a closed configuration to be insertable into a hole in the wall and expandable into an open configuration to prevent the anchoring device from being removed from the wall.

4 Claims, 10 Drawing Sheets

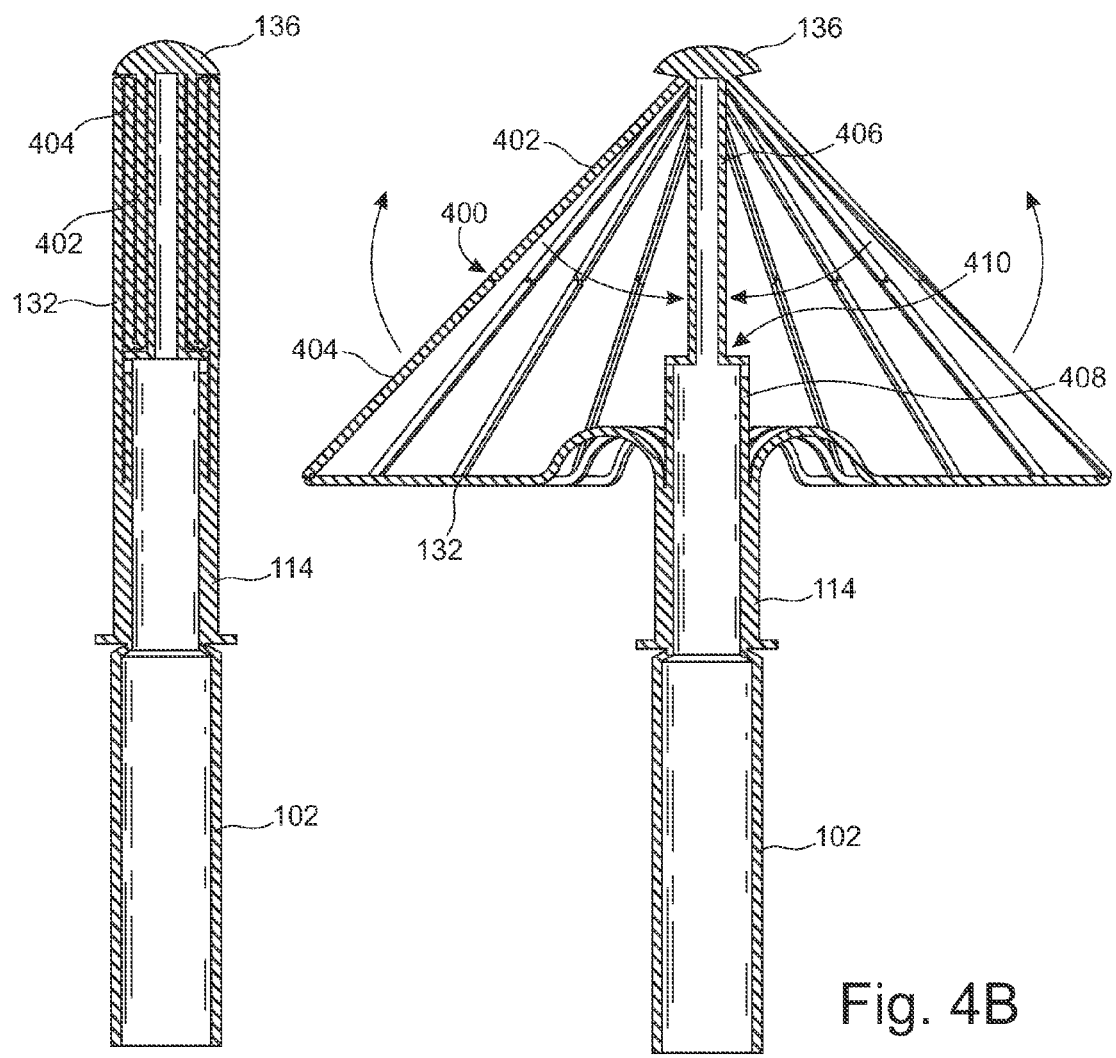
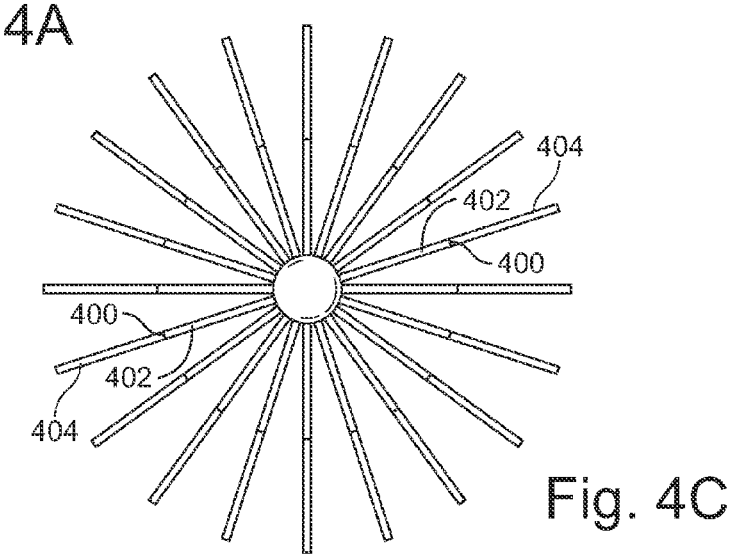
Fig. 4A
Fig. 4B
Fig. 4C

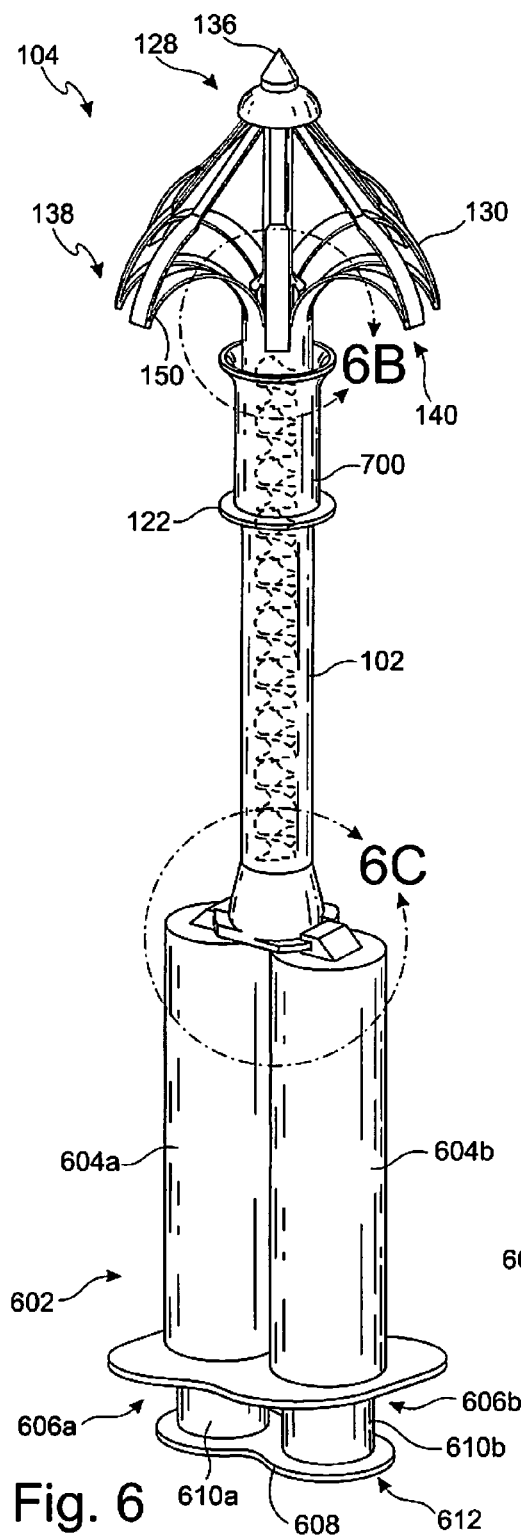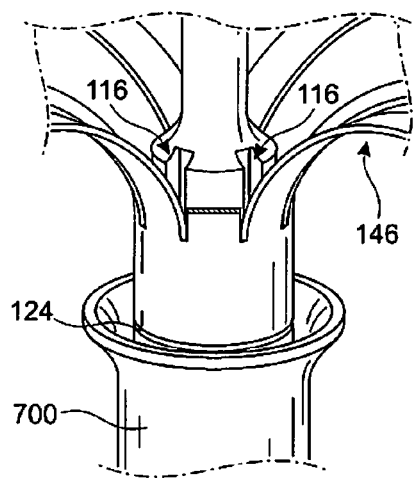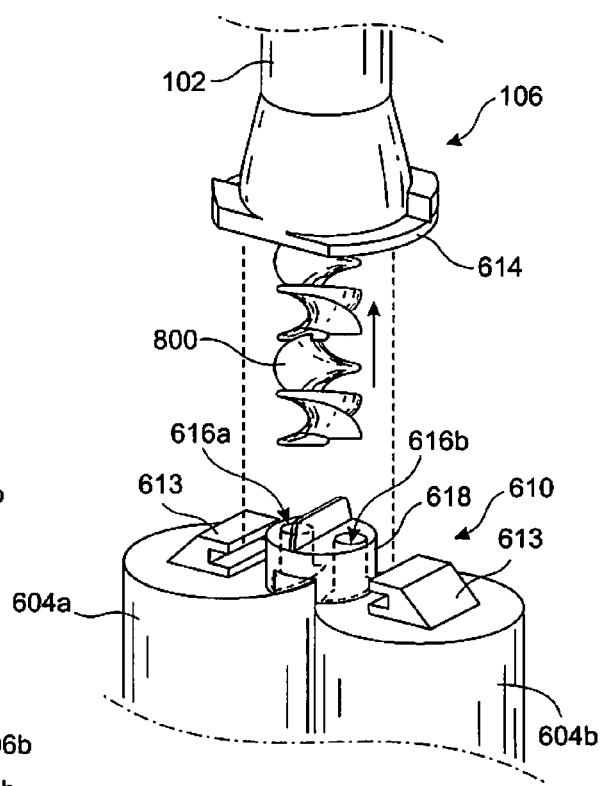
Fig. 6
Fig. 6B
Fig. 6C

METHOD OF SECURING A WALL ANCHOR TO A WALL

CROSS-REFERENCE

This patent application claims the benefit of U.S. Provisional Patent Application No. 61/255,787, filed Oct. 28, 2009, entitled "Wall Anchor," which application is incorporated in its entirety here by this reference.

BACKGROUND OF THE INVENTION

1. Technical Field

This invention relates to an anchoring device for walls, such as drywalls.

2. Background Art

The present invention is directed towards an anchoring device to improve the structural integrity of existing walls, such as drywalls. Current anchoring devices require unnecessary tubing or balloons. Others require complicated shapes or designs. Some require multiple steps, while others utilize devices that do not have the proper strength to provide the necessary support.

Thus, there is a need for an anchoring device that can quickly, efficiently, and effectively provide support to a wall without the use of complicated devices and unnecessary steps.

BRIEF SUMMARY OF INVENTION

The anchoring device comprises a shaft having a first end and a second end opposite the first end, and an anchor attached to the second end. The shaft may be hollow or provide other means for delivering a securing compound from one side of a wall to the opposite side of the wall. An entry port at the first end of the shaft receives a securing compound and delivers the securing compound to the second end of the shaft. The second end of the shaft is in fluid communication to the shank of the anchor. The shank may also be hollow and has at least one exit port through which the securing compound can exit. The anchor further comprises bendable or moveable flukes that can adapt to a closed configuration to be insertable through a hole and an open configuration to prevent the withdrawal of the anchor once through the hole.

The securing compound may comprise at least two separate, liquid sub-components that mix together to form an adhesive or foam material to secure the anchor to the wall.

In some embodiments, the shaft may comprise a dividing wall to keep the sub-components of the securing compound separate to facilitate delivery of the securing compound to the exit port.

In some embodiments, the shaft may comprise internal components to facilitate mixture of the sub-components prior to exiting the anchoring device.

In some embodiments, the anchor may comprise a crown at the tip of the shank that can be used to create holes in the wall.

BRIEF DESCRIPTION OF THE DRAWINGS

FIG. 4A shows a side view of another embodiment of the present invention in the closed configuration;

FIG. 4B shows a side view of the embodiment shown in FIG. 4A in the open configuration;

FIG. 4C shows a top view of the embodiment shown in FIG. 4A;

FIG. 6 is a perspective view of another embodiment of the present invention;

FIG. 6B is a close up of 6B identified in FIG. 6;

FIG. 6C is a close up of 6C identified in FIG. 6;

DETAILED DESCRIPTION OF THE INVENTION

Figure 1A:
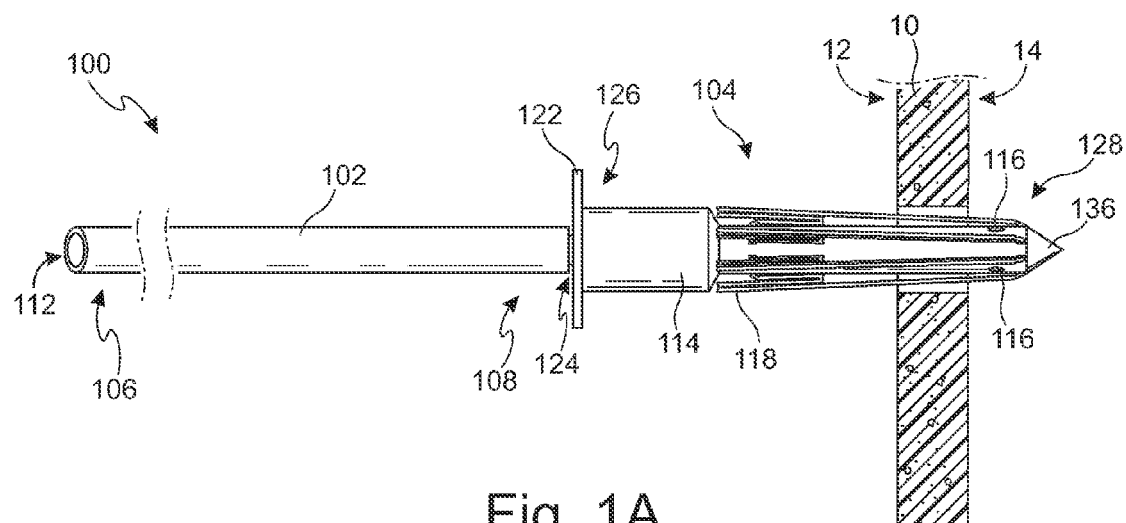
FIG. 1A shows a side view of an embodiment of the present invention being inserted into a wall.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As shown in the Figures, the anchoring device 100 is designed to be insertable into a wall 10 through a first side 12, and held in place by an anchor 104 on the opposite side 14 to deliver a securing compound 110 to the opposite side 14 of the wall 10 and secure the anchor 104 to the wall 10. The securing compound may be initially fluid but is transformable into a viscous or hardened substance. The anchoring device 100 comprises an elongated shaft 102 having a first end 106 and a second end 108, and an anchor 104 in fluid communication with the second end 108 of the shaft 102. The anchor 104 comprises a shank 114 connected to the second end 108 of the shaft 102, and an exit port 116 opposite the shaft 102 through which the securing compound 110 is released.

The shaft 102 provides a means for delivering the securing compound 110 into or through a wall 10. In general, the shaft 102 is a cylindrical rod or pole having a first end 106 and a second end 108 opposite the first end 106, and having a means for delivering a fluid 120 from the first end 106 to the second end 108. The first end 106 may have an entry port 112 into which a securing compound 110 can be administered so as to deliver the securing compound 110 onto or through the shaft 102 to the second end 108. The second end 108 may be in fluid communication with the anchor 104 to deliver the securing compound 110 to the anchor 104. Although a cylindrical shape of the shaft 102 is the preferred embodiment to penetrate or be inserted into a wall 10, any shape can be used, such as triangles, squares, and other polygonal shapes.

Figure 1B:
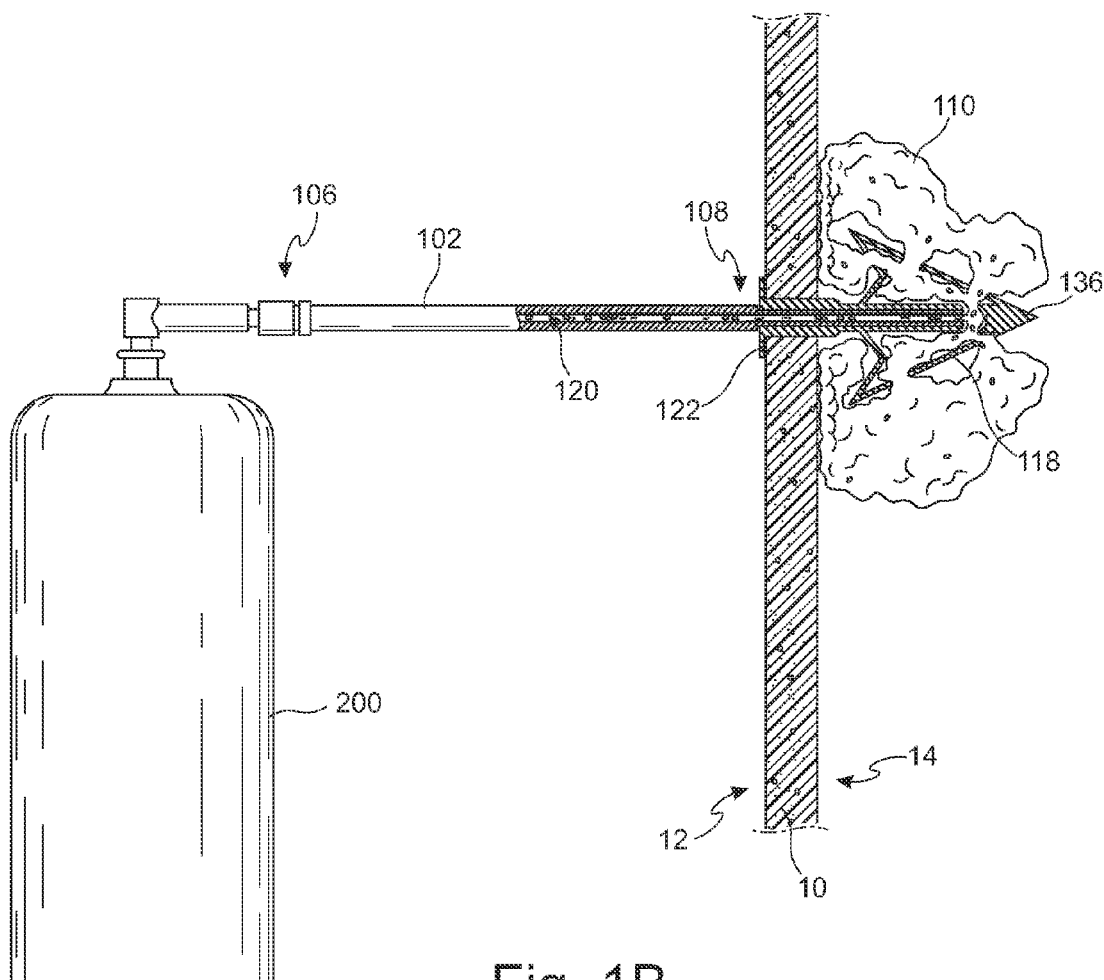
FIG. 1B shows a side view and partial longitudinal-sectional view of an embodiment in the present invention after the anchoring device has been pushed through a hole in the wall.
Figure 1C:
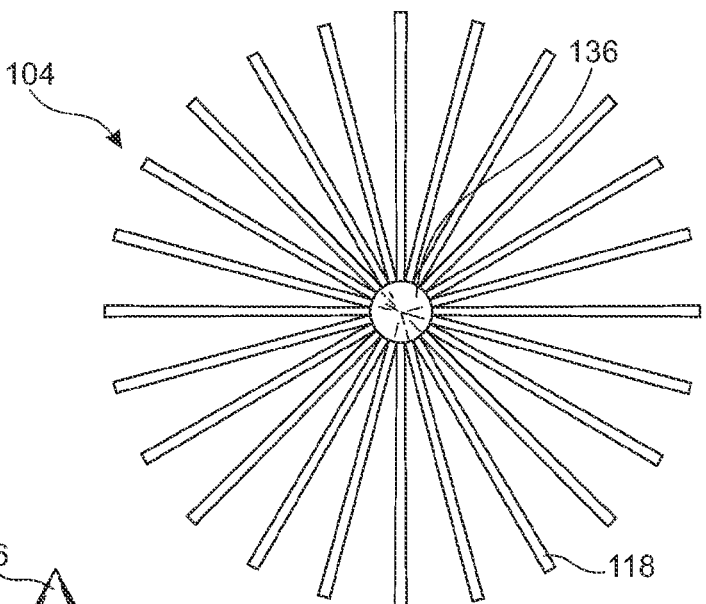
FIG. 1C shows a top view of the embodiment in FIG. 1A in the open configuration.
Figure 2A:
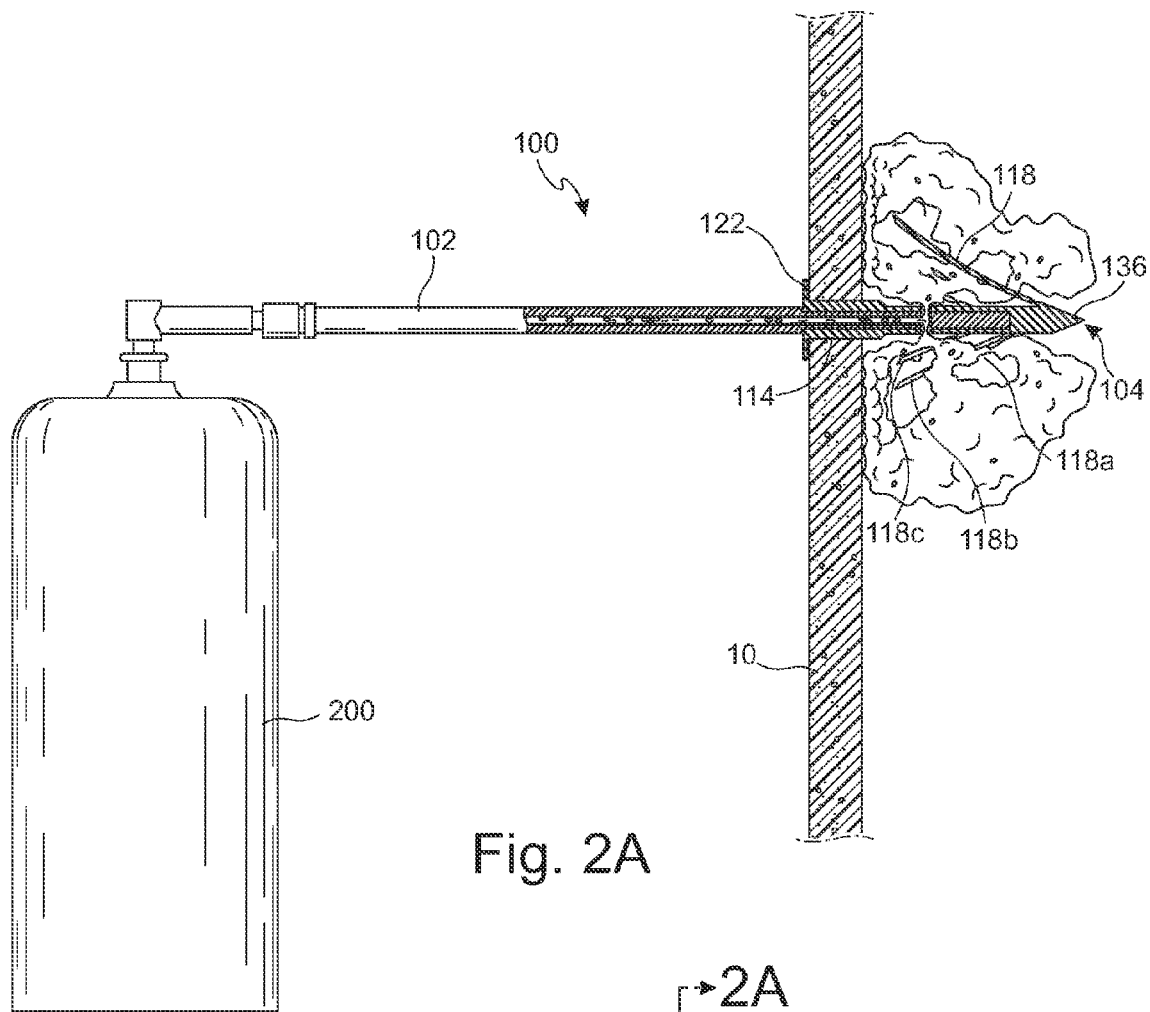
FIG. 2A shows a side view and partial longitudinal sectional view of another embodiment of the present invention.

The means for delivering the fluid 120 from the first end 106 to the second end 108 may be a tunnel in or through the shaft 102 or a groove on the shaft 102. The means for delivering the fluid 120 may be in fluid communication with the entry port 112 at the first end 106 and the anchor 104 at the second end 108. This allows the securing compound 110 to enter through the entry port 112, into the means for delivering the fluid 120, exit out of the shaft 102 at the second end 108, and into the anchor 104 as shown in FIGS. 1B, 2A, and 9D.

Figure 5:
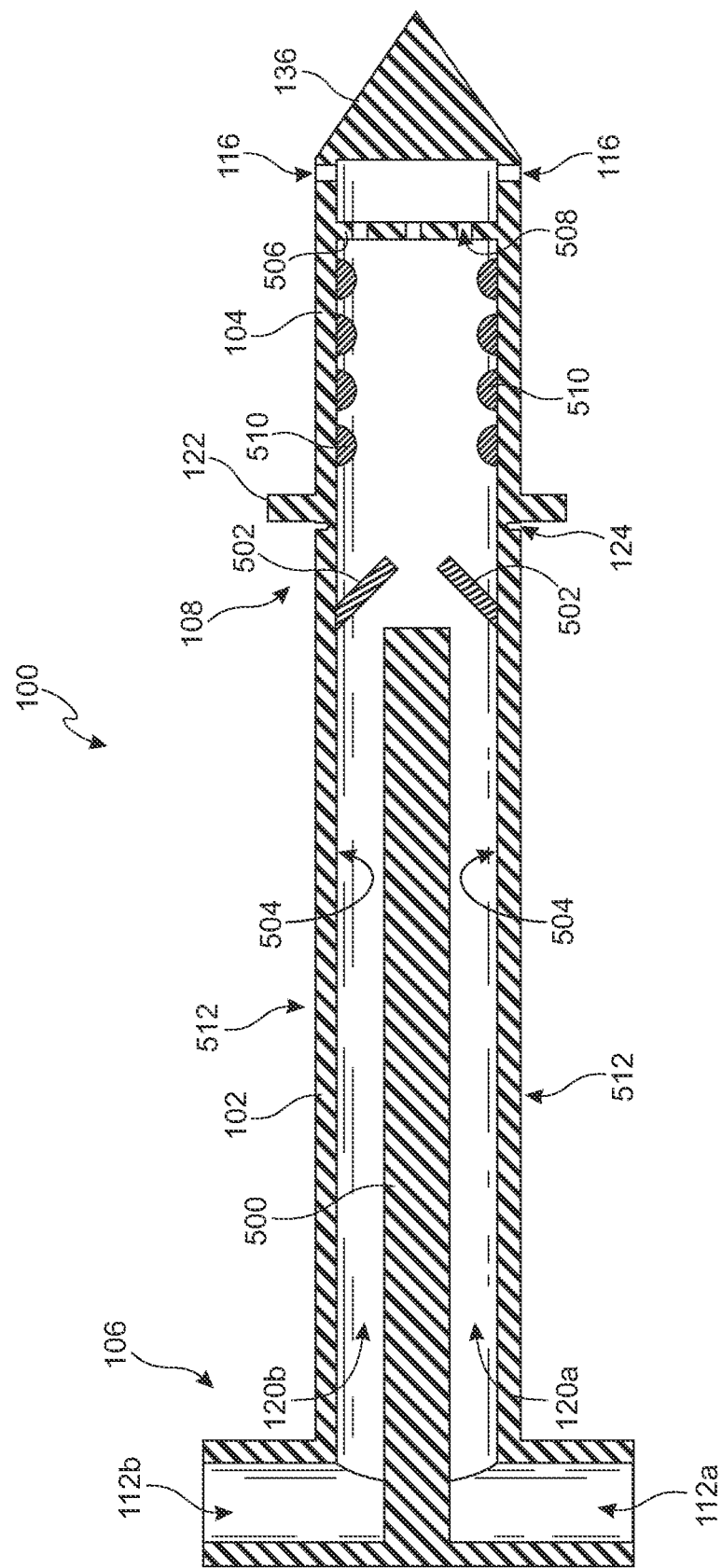
FIG. 5 shows a longitudinal-sectional view of the shaft and shank with the flukes removed for clarity.

In some embodiments, as shown in FIG. 5, the first end 106 may have at least two entry ports 112a, 112b in fluid communication with the means for delivering the fluid 120 to the second end 108. This will allow at least two separate compounds to be delivered into the shaft 102 simultaneously. In some embodiments, a divider 500 separating the shaft 102 into two compartments 120a, 120b may keep the two compounds separated until a predetermined point has been reached, at which point the two compounds are allowed to mix and begin the transformation process into a viscous or hardened securing compound 110. Before transformation is complete, however, the mixture can exit through the exit ports 116 of the anchor 104.

For example, a securing compound 110 may require a chemical reaction between two separate, liquid sub-components before transforming into the securing compound 110. This transformation may occur on the order of seconds. In such a situation, the two separate liquid compounds may be injected into the shaft 102 through two separate entry ports 112a, 112b, kept separate by the divider 500, then combined just prior to exiting the shaft 102 and anchor 104 so that shortly after exiting the shaft 102, the subcomponents mix, then coagulate, congeal or otherwise transform into a solidified or cured substance.

In some embodiments, the anchoring device 100 may further comprise a means for facilitating the mixing of the compounds just prior to exiting the shaft 102 or the anchor 104. The means for facilitating the mixing of the compounds may be a physical barrier, an impediment, an obstruction, or the like that forces the separate compounds to merge and mix together. For example, the inner walls 504 of the shaft 102 or shank 114 of the anchor 104 may contain auxiliary walls 502 angled toward each other and protruding obliquely or perpendicularly from the inner walls 504 such that as the compounds move towards the exit port 116, the compounds are forced against the auxiliary walls 502 and into each other before exiting the shaft 102 or shank 114.

In another example, the means for facilitating the mixing of the compounds may be a porous wall 506 positioned at the second end 108 of the shaft 102 or inside the shank 114. The porous wall 506 impedes the flow of the compounds towards the exit port 116 thereby forcing the compounds to mix. The mixed compounds eventually make their way through the pores 508 and out the exit port 116 in the mixed state.

In some embodiments, the means for facilitating mixing may be protrusions or bumps 510 on the inner walls 504 of the shaft 102 or shank 114 to create turbulence in the flow of the compounds through the shaft 102 or shank 114 rather than a smooth flow. The turbulence causes the compounds to mix while traveling through the shaft 102 or shank 114.

In some embodiments, the means for facilitating mixing may be a member that can be inserted and removed from the shaft 102 and/or the shank 114. For example, the means for facilitating mixing may be an elongated mixing member 800 having various contours causing the securing compound 110 in fluid form to constantly change directions of flow; thereby causing the securing compound to mix as it is forced through the shaft 102 and/or shank 114.

Figures 7, 8:
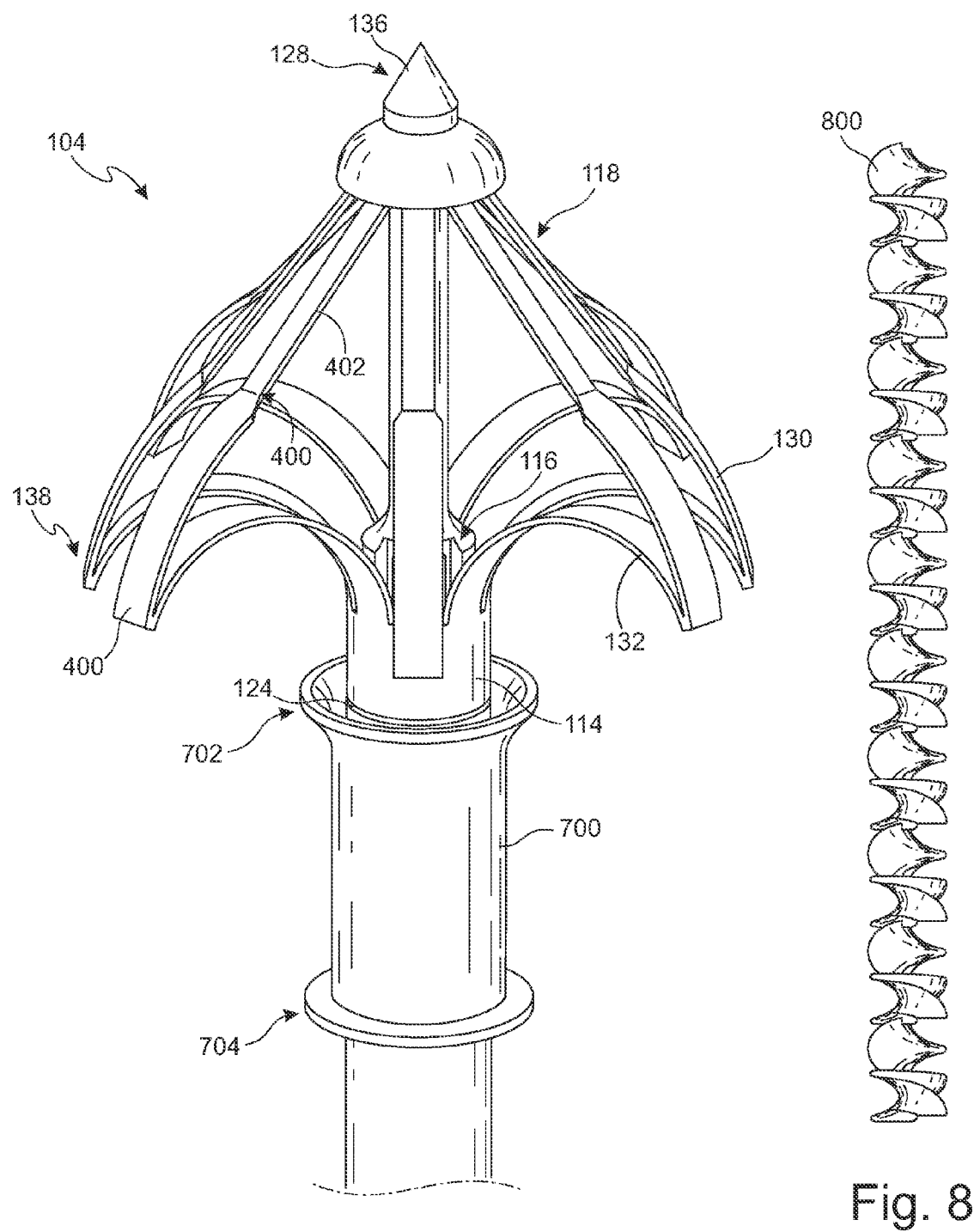
FIG. 7 is a close up of an embodiment of the anchor.
FIG. 8 is a perspective view of an embodiment of a mixing member.

An example of an elongated mixing member 800 may be a helical rod, as shown in FIGS. 6C and 8. The helical rod has a diameter substantially similar to the diameter defined by the inner wall 504 of the shaft 102 or shank 114.

Various other barriers, obstructions, or impediments may be positioned at or near the second end 108 in any combination to force the two separated compounds to mix before exiting the exit port 116. Depending on the duration of time required for the compounds to congeal, the obstruction or impediments that force compounds to mix can be placed anywhere along the shaft 102, such as at the first end 106, the middle portion, the second end 108, or anywhere therebetween, so that the compounds can mix while in a fluid state, then exit the exit port 116 in the anchor portion 104 in the mixed state, and transform outside the anchoring device 100 to secure the anchor 104 to the wall 10.

In some embodiments, the shaft 102 or the shank 114 further comprises a stop 122 on the outer surface or outer wall 512 of the shaft 102. The stop 122 prevents the shaft 102 from being inserted into the wall 10 beyond a certain point. The stop 122 may be positioned along the shaft 102 at the second end 108 or at the base of the shank 114 so that the flukes 118 of the anchor 104 can be inserted through the wall 10 and emerge from the other side 14. The stop 122 may be any type of protrusion extending radially outward from the outer surface of the shaft 102 or shank 114. For example, the stop 122 may be a flange, a bump, a rod, or the like.

In some embodiments, the shaft 102 may further comprise a detachment point 124. The detachment point 124 allows the shaft 102 to be detached from the anchor 104 so that the anchor 104 remains in the wall 10 on the hidden side 14, but on the side 12 visible to the user, the anchor device 104 remaining in the wall 10 is minimized and can be easily covered up with plaster, wall paper, picture frames, or the like. As such, in some embodiments, the detachment point 124 is directly adjacent to the stop 122. In some embodiments, the detachment point 124 may be on the side of the stop 122 adjacent to the wall 10. In other embodiments, the detachment point 124 may be on the side of the stop 122 opposite or away from the wall 10.

The detachment of the shaft 102 from the anchor 104 may be irreversible or reversible. For example, the detachment point 124 may be an etching, a scoring, a groove, or some other modification around the perimeter of the outer surface 512 of the shaft 102 to weaken the shaft 102 at the detachment point 124. This allows the user to snap the shaft 102 off from the anchor 104 quickly and efficiently without the use of additional tools. Although this may be manufactured cheaper than a reversible detachment, the shaft 102 can only be used one time.

In some embodiments, the shaft 102 may have a reversible detachment point 124. For example, the shaft 102 at the second end 108 may be threaded to screw into the shank 114 of the anchor 104. Other types of quick and easy, reversible attachment systems may be used such as resistance fit, bayonet-type mount, clips, and the like. When using reversible attachment systems, a gasket may be required to prevent the liquid compounds from leaking out at the detachment point 124. Reversible detachment points may be more expensive to manufacture, but these can be reused with other anchors 104.

The anchor 104 stabilizes the shaft 102 while the securing compound 110 is delivered into the wall 10. The anchor 104 comprises a shank 114 having a base 126 attached to the shaft 102 and a tip 128 opposite the base 126, and at least one fluke 118 attached to the shank 114 at, near, or adjacent to the tip 128. In some embodiments, the shank 114 is simply a continuation of the shaft 102.

The shank 114, like the shaft 102, may be hollow or have grooves to provide a means for delivering 120 the securing compound into or behind the wall 10. The shank 114 also comprises an exit port 116 anywhere along the shank 114 so that the securing compound 110 can exit the shank 114 and secure the anchor 104 to the wall 10. In some embodiments, the shank 114 may comprise a plurality of exit ports 116.

Figure 9A:
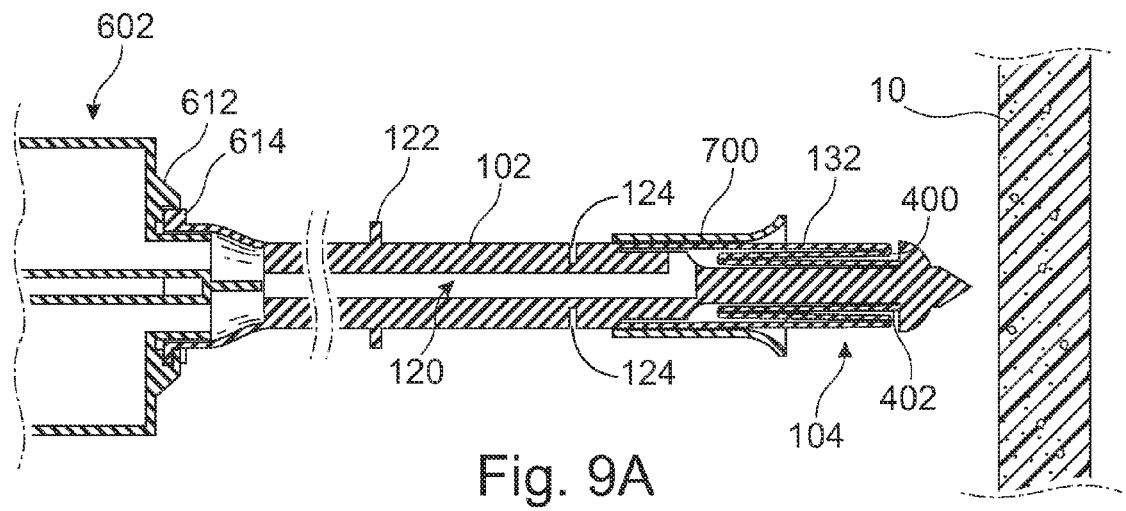
FIG. 9A is a cross-sectional view of an embodiment of the present invention.
Figure 9B:
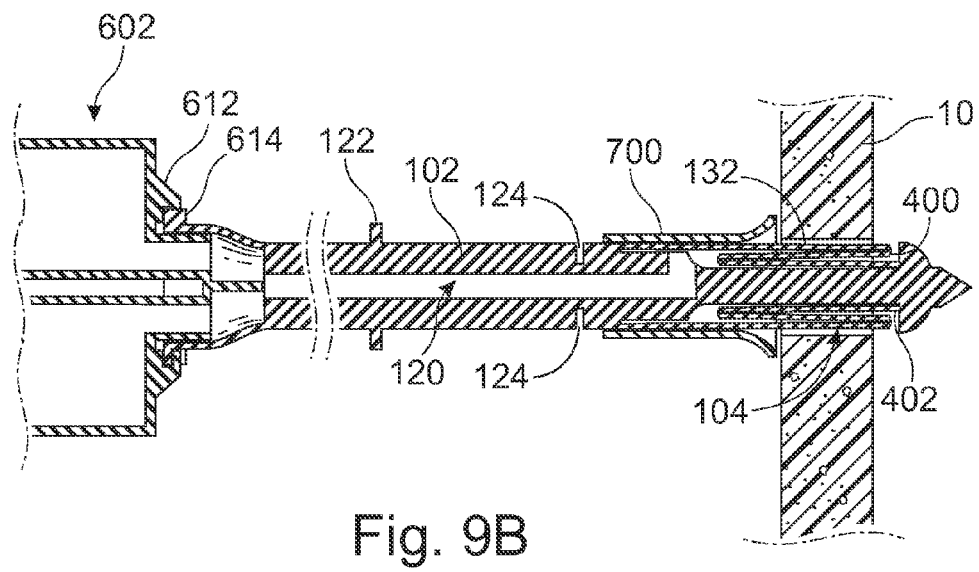
FIG. 9B is a cross-sectional view of the embodiment shown in FIG. 9A partially inserted into a wall.
Figure 9C:
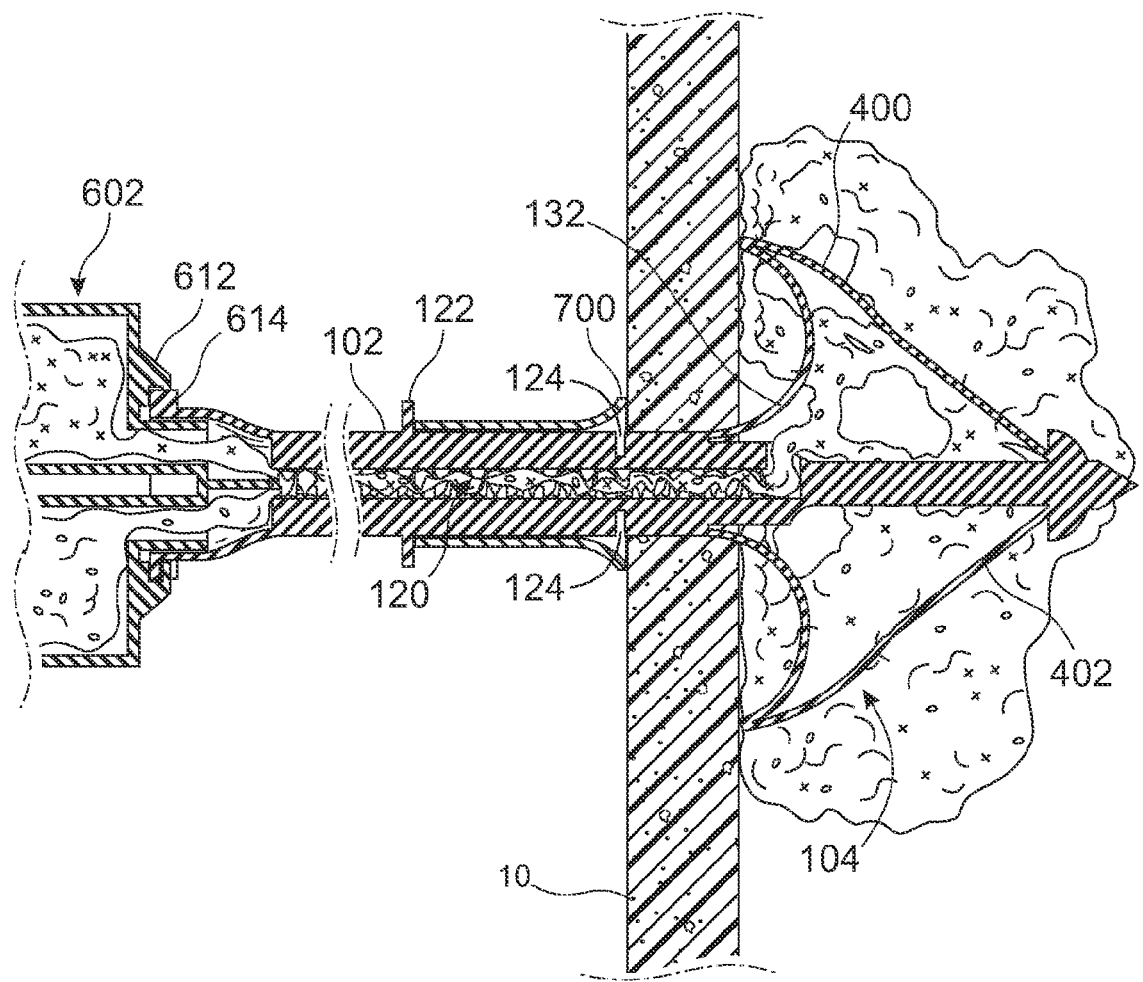
FIG. 9C is a cross-sectional view of the embodiment shown in FIGS. 9A and 9B fully inserted into the wall with the securing compound being administered through a mixing member.

The fluke 118 is designed to have an open configuration and a closed configuration. While in the closed configuration the anchor 104 can be inserted into a wall 10 as shown in FIGS. 1A, 9A, and 9B. Once the flukes 118 are inserted all the way through the wall 10, the anchor 104 can assume an open configuration to prevent the anchor 104 from being pulled back out of the wall 10 as shown in FIGS. 1B, 2A, 3A, and 9C.

To allow for an open and closed configuration the flukes 118 may be pliable, elastic, and/or semi-rigid. For example, the natural state of the flukes 118 may be the open position. However, due to the pliability, elasticity, or semi-rigidness, the flukes 118 may be bent into a closed configuration so as to be insertable into a hole, but then spring back into its original open configuration once out of the hole as shown in FIGS. 1A, and 9A-9C.

In some embodiments, the flukes 118 may be hingedly attached to the shank 114 to allow the flukes 118 to be retracted into the closed configuration and expanded into the open configuration. For added strength and stability to the anchor 104, the flukes 118 may comprise a barb 130 and a stabilizer 132. The first end 134 of the barb may be hingedly attached to the shank 114 near the crown 136. The second end 138 of the barb may be hingedly attached to the first end 140 of the stabilizer 132. The second end 142 of the stabilizer 132 may be hingedly attached to the shank 114. The stabilizer 132 comprises a joint 146 in between the first and second ends 140, 142, thereby defining a first arm 150 and a second arm 152. The joint 146 allows the first and second arms 150, 152 of the support 132 to move towards and away from each other to facilitate collapsing and expanding the flukes 118. The joint 146 may be spring-loaded to maintain an outwardly biasing force to keep the flukes 118 in the open configuration. Springs can be used on any portion of the flukes to keep them in an open configuration as their natural states.

Similarly, the flukes 118 may be hingedly attached to or near the tip. The hinged attachment 154 of the flukes 118 to the shank 114 may also have a spring-loaded attachment to maintain the open configuration in the natural state. In some embodiments, rather than spring-loaded hinges, the flukes 118 and stabilizer 132 may be made of elastic, pliable material that allows the flukes 118 and stabilizer 132 to maintain an open configuration in the absence of external forces, but is compressible into a closed state with the application of an external force.

In some embodiments, as shown in FIGS. 4A-4C, the barb 130 may have a joint 400 separating the barb 130 into an upper piece 402 and a lower piece 404. The stabilizer 132 may be elastic or spring-loaded to impart an outward force upon the lower piece 404. The upper shank portion 406 may have an outer diameter that is smaller than the outer diameter of the lower shank portion 408. In other words, the upper shank portion 406 may be recessed in 410 relative to the lower shank portion 408. When an inward force is applied to the upper piece 402, such that the upper portion 402 is pushed towards the upper shank portion 406, the barb 130 collapses at the joint 400 allowing the upper piece 402 to fit inside the recess 410, while the lower piece 404 bends towards the crown 136 and abuts parallel to the upper piece 402, and the support 132 moves up towards the crown 136 and abuts parallel to the lower piece 404. In the preferred embodiment, in the closed configuration, the overall outer diameter of the upper shank portion 406, including the upper piece 402, the lower piece, 404, and the support 132, is approximately the same as the outer diameter of the lower shank portion 408 so as to form a uniform cylindrical shape that can be inserted into a hole in the wall 10. Once the shank 114 protrudes out from the other side 14 of the wall 10, the barb 130 springs back into the open configuration, partly due to the elasticity of the support 132. Other means for folding and packaging the barbs in the closed configuration may be utilized.

For example, in some embodiments the anchoring device may further comprise a sleeve 700 encircling the shank 114 and can slide along the shank 114. In the preferred embodiment, the sleeve 700 is cylindrical in shape with a fluke engaging end 702 and a shaft engaging end 704. In some embodiments, the fluke engaging end 702 gradually expands radially outwardly. In use, the user simply slides the sleeve 700 towards the fluke 118. Due to the smooth and gradual expansion, the stabilizer 132 is pressed upwardly and centrally as it enters into the sleeve 700. The barb 130 then collapses at the joint 400 causing the lower piece 400 to bend towards the crown 136 while the upper piece 402 moves radially towards to shank 114. Once fully encased inside the sleeve 700, the upper piece 402, lower piece 400, and stabilizer 132 are essentially parallel to each other so that the anchor 104 can be inserted into the appropriate hole in the wall.

As the sleeve 700 abuts the wall 10, continued pushing causes the sleeve 700 to maintain its position relative to the wall 10 while the anchor 104 continues to enter into the hole. Eventually, the anchor 104 will penetrate out of the wall 10 on the opposite side without the sleeve 700. This will cause the barbs 130 to spring back into its open configuration preventing the anchor from 104 being pulled out from the wall 10.

Figure 1D:
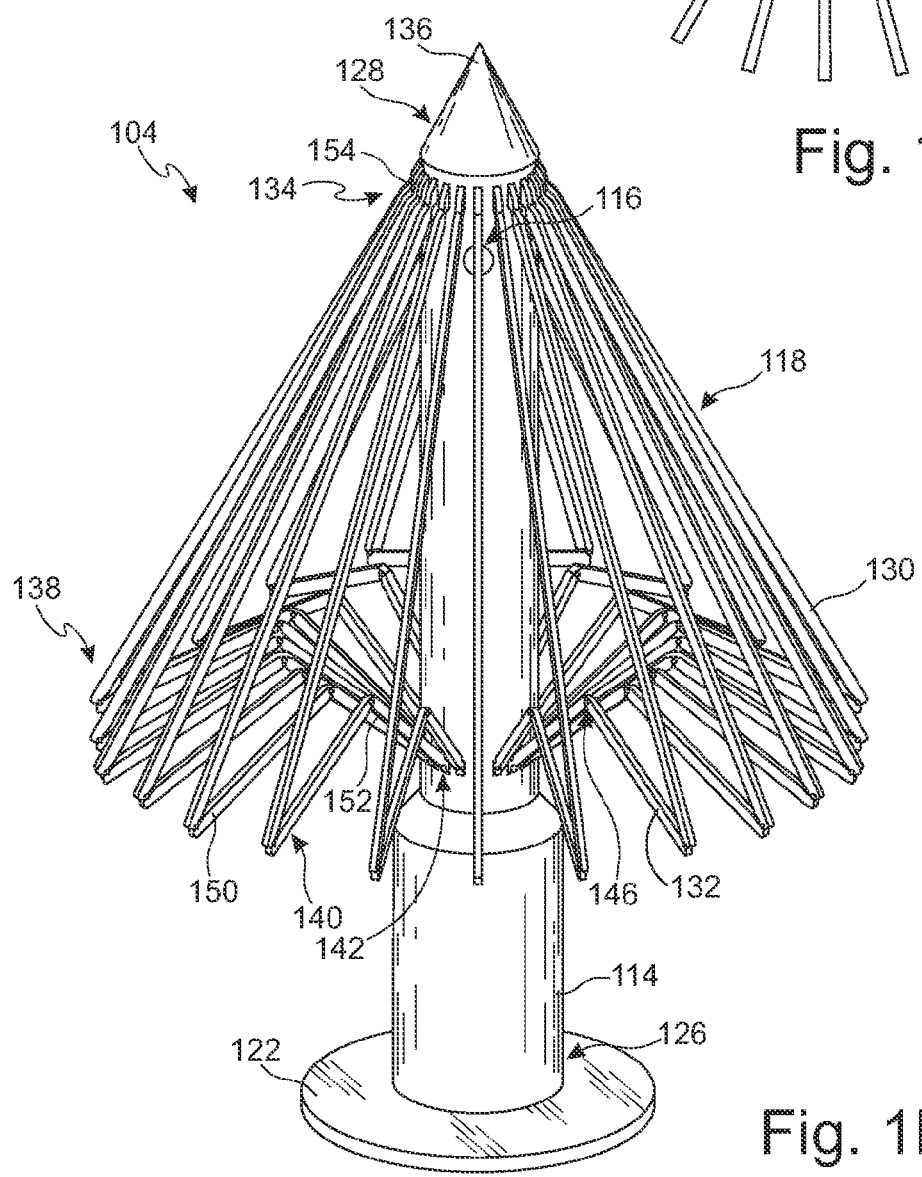
FIG. 1D shows a close-up, perspective view of the anchor portion shown in FIG. 1A.
Figure 2B:
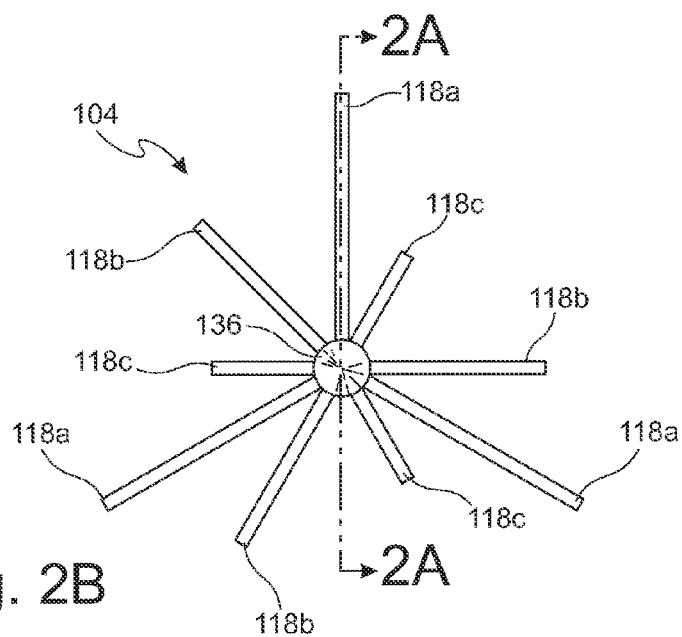
FIG. 2B shows a top view of the anchor shown in FIG. 2A.

The flukes 118 may be arranged in any number of different configurations. In some embodiments, a plurality of flukes 118 may be circumferentially arranged around the shank 114 as shown in FIG. 1D. In some embodiments, as shown in FIGS. 2A and 2B, a plurality of groups of flukes 118 may be positioned on the shank 114 with each group comprising a plurality of flukes 118 circumferentially arranged around the shank 114. For example, a first group of flukes 118a may be attached near the tip 128 of the shank 114 and arranged circumferentially around the shank 114. A second group of flukes 118b may be attached at about the mid-portion of the shank 114 and arranged circumferentially around the shank 114. A third group of flukes 118c may be attached near the base 126 of the shank 114 and arranged circumferentially around the shank 114. In some embodiments, each group 118a, 118b, 118c may have the same number of flukes 118. To improve the versatility of the anchor, the flukes 118 in one group may be angularly offset from the flukes 118 in an adjacent group as shown in FIG. 2B. In some embodiments, to improve the stability of the anchor, the length of the flukes 118 in each group may differ from another group in such a way that the ends of all of the flukes 118 terminate at about the same level relative to the shank 114.

Figure 3A:
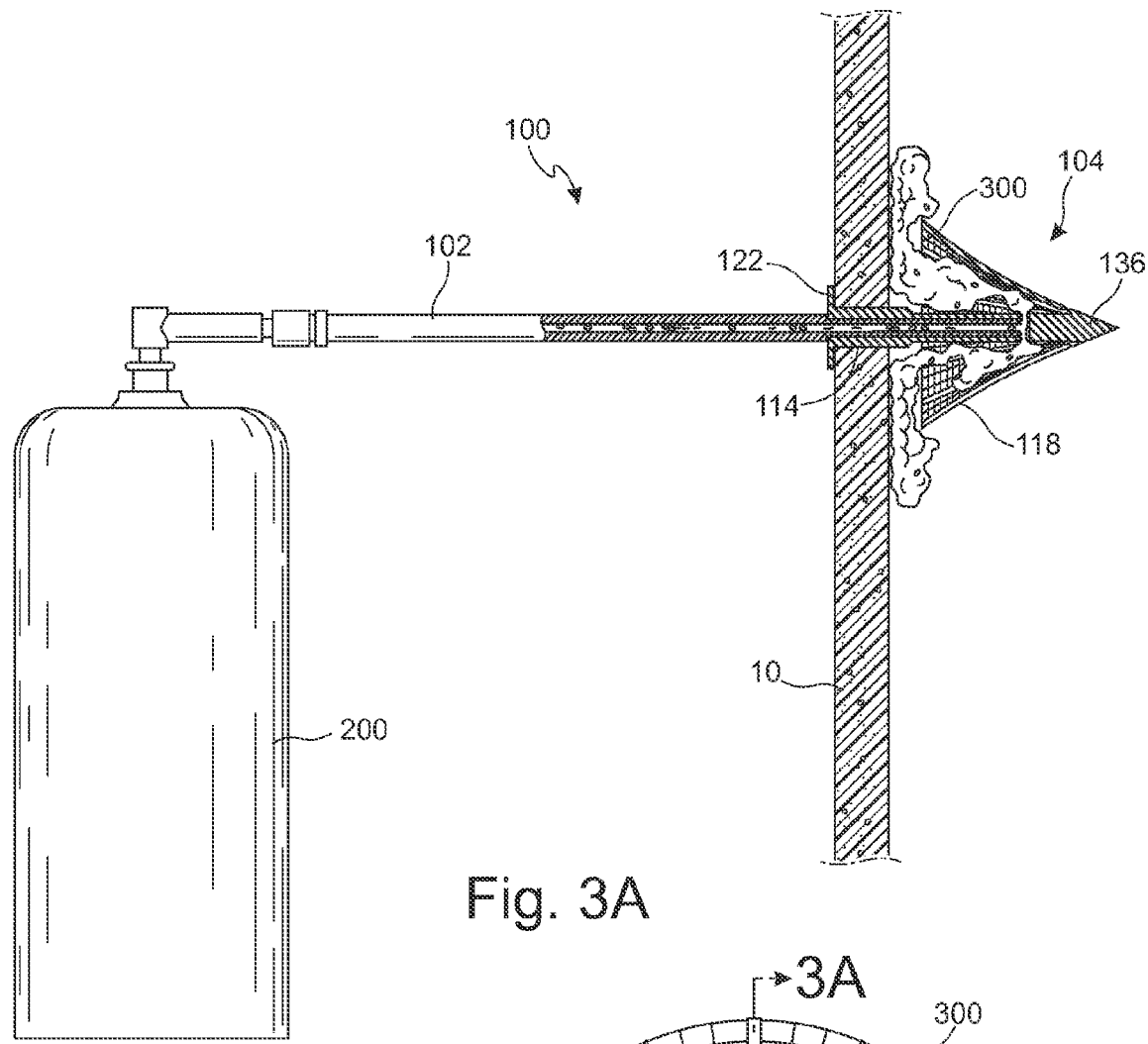
FIG. 3A shows a side view and partial longitudinal-sectional view of another embodiment of the present invention.
Figure 3B:
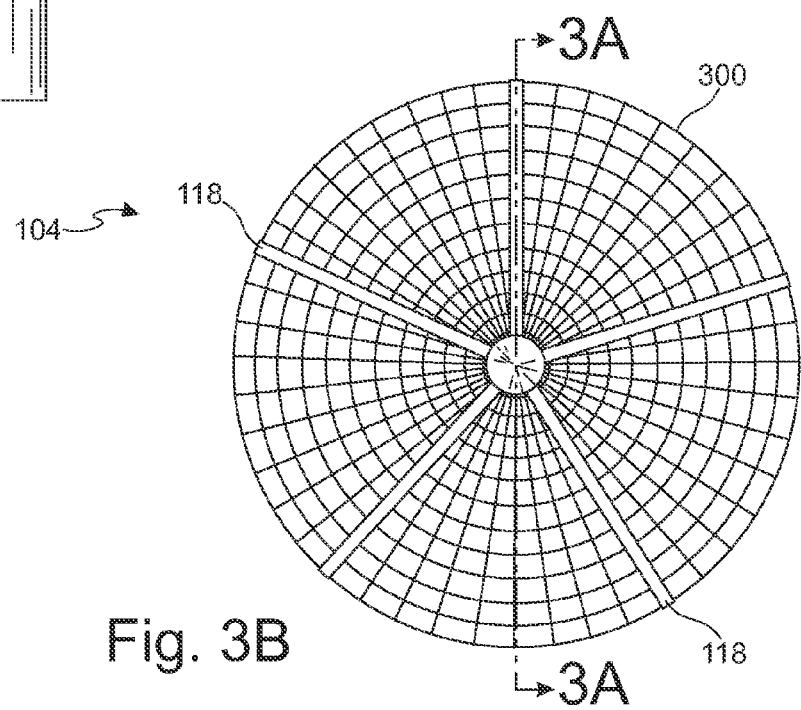
FIG. 3B shows a top view of the anchor shown in FIG. 3A.

In some embodiments, to facilitate securement of the securing compound 110 at the anchor 104, the anchor 104 may further comprise a net 300 as shown in FIGS. 3A and 3B. The net 300 may be attached to the flukes 118, the shank 114, and/or the crown 136. Securing compound material 110 that exits the exit port 116 is more likely to become trapped within the net 300 as opposed to dripping off the anchor 104 if the securing compound 110 has not yet completely solidified. This improves the probability that the securing compound 110 will secure the anchor 104 to the wall 10.

The anchor 104 may further comprise a crown 136 at the tip of the shank 114. The crown 136 may have a sharp point so as to facilitate penetration into the wall 10, including creating a hole in the wall 10. For example, the crown 136 may be cone shaped having a sharp tip. The crown 136 can then be thrust, drilled, or pounded into the wall 10 to create a hole. In another example, the crown 136 may be threaded like a drill-bit or a screw, such that twisting the crown 136 into the wall 10 facilitates creating a hole in the wall 10. Once the anchor 104 has penetrated the wall 10, the securing compound 110 can be released inside or behind the wall 10.

The securing compound 110 can be any compound or combination of compounds typically used in construction to secure, seal, or set various pieces of material in place. For example, the securing compound 110 may be an expanding foam, adhesive, foam adhesive, glue, sealant, caulk, or the like. Typically the securing compound 110 comprises at least two separate compounds in liquid or gel form that when mixed together set within a matter of seconds or minutes. In some embodiments, the securing compound 110 may be a single component that is initially in a liquid or fluid state but solidifies with time when exposed to air and/or heat. The securing compound 110 helps stabilize the anchor 104 in place as well as provide structural support or rigidity to the anchor 104 itself.

The securing compound 110 may be introduced into the shaft 102 by a variety of delivery means 200, such as through an aerosol can, cartridge, syringe, caulking gun, tube, pump, or the like. A delivery means 200 may be adapted to connect to the first end 106 of the shaft 102 and deliver the securing compound 110 into the shaft 102. In some embodiments, the subcomponents of the securing compound 110 may be mixed within the delivery means 200 prior to injecting into the shaft 102, while in the shaft 102, or while the subcomponents are being ejected from the anchor 104.

By way of example only, the delivery means 200 may be a syringe, and in particular, a double-barrel syringe 602. The double-barrel syringe 602, as the name implies, comprises two bodies or barrels 604a, 604b, each barrel comprising an open end 606a, 606b into which a plunger 608 may be inserted, and a hub 610 to connect with the shaft 102. In the preferred embodiment, the two barrels 604a, 604b are connected together, effectively forming a single syringe having two separated compartments. The syringe 602 further comprises a dual-shaft plunger 608. Again, as the name implies, the dual-shaft plunger 608 comprises two plunging members 610a, 610b each having a plunger tip that is insertable into one of the compartments of the double-barrel syringe, and a plunger top 612 upon which force can be applied to plunge the insertable ends into the barrels of the double-barrel syringe 602. The plunger tops 612 of each of the plungers may be connected together so that the two plungers effectively works as one.

Although the syringe 602 and the shaft 102 may be formed as a single integral unit, in the preferred embodiment, the hub 610 of the syringe 602 is modified to reversibly connect with the shaft 102 and to allow the contents of both barrels 604a, 604b to merge into the shaft 102 together. Any type of reversible fastener can be used, such as screw-in fasteners, resistance-fit fasteners, clips, bayonet-type mounts, and the like. In the preferred embodiment, the hub 610 comprises an L-slot 613 and the first end 106 of the shaft 102 comprises pins or flanges 614 that can be inserted into the L-slots 613 to securely lock the syringe 602 to the shaft 102. The hubs 610 of the syringe 602 each comprise an exit hole 616a, 616b located medially or in between the L-slots 613. Once the syringe 602 is locked on to the shaft 102, each exit hole 616a, 161b of each barrel 604a, 604b is positioned to dispense their respective contents into the shaft 102.

In some embodiments, to reduce the possibility of any leakage of the contents outside of the shaft 102, the hub 610 may further comprise a dispensing channel 618. The dispensing channel 618 may shaped and sized substantially similar to the opening 112 at the first end 106 of the shaft 102 so that the dispensing channel 618 fits into the opening 112, but with some resistance. This directs the contents deeper into the shaft 102 and reduces the chance of the contents backflowing out through the opening 112 of the shaft 102.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method of securing a wall anchor to a wall, comprising:
   a. providing an anchoring device, comprising:
      i. an anchor, comprising a shank, a plurality of flukes attached to the shank, the plurality of flukes configured to have an open configuration and a closed configuration, a crown adjacent to the flukes, and an exit port on the shank;
      ii. a shaft operatively connected to the anchor, the shaft comprising a first end having an opening to receive a securing compound, a second end opposite the first end connected to the anchor, a means for delivering a fluid from the first end to the second end, a stop circumscribing an exterior of the shaft, and a detachment point, and
      iii. a dispenser in fluid communication with the first end of the shaft;
   b. collapsing the flukes into the closed position;
   c. inserting the anchor into the wall, wherein the flukes automatically deploy back into the open configuration once inserted completely through the wall; and
   d. administering the securing compound from the dispenser, through the shaft, and out the exit port of the anchor, upon which the securing compound solidifies to secure the anchor to the wall.

2. The method of claim 1, wherein the collapsing of the flukes into the closed position is accomplished by sliding a sleeve along the shank towards the flukes to encase the flukes inside the sleeve in the closed position.

3. The method of claim 1, further comprising providing a net on the anchor to minimize loss of the securing compound prior to solidifying.

4. The method of claim 1, further comprising removing the shaft from the shank so as to minimize protrusion from the wall.

* * * * *